United States Patent [19]

Fukushima et al.

[11] 4,053,401
[45] Oct. 11, 1977

[54] SLUDGE TREATING PROCESS

[75] Inventors: Fumiaki Fukushima, Oojihon; Tasuku Sugita, Tokyo; Kohei Kobayashi, Tokyo; Hiroshi Asada, Tokyo; Arata Onishi, Chofu, all of Japan

[73] Assignee: Nichireki Chemical Inudstry Co., Ltd, Tokyo, Japan

[21] Appl. No.: 635,493

[22] Filed: Nov. 25, 1975

[30] Foreign Application Priority Data

Nov. 29, 1974 Japan ............................. 49-136296

[51] Int. Cl.$^2$ ................................................ C02C 5/02
[52] U.S. Cl. ............................................ 210/52; 210/54; 210/55
[58] Field of Search ....................... 210/10, 42, 46, 47, 210/50–55, 59

[56] References Cited

U.S. PATENT DOCUMENTS

| 191,853 | 6/1877 | Hille | 210/54 |
| 1,891,294 | 12/1932 | Conway et al. | 210/54 |
| 3,642,619 | 2/1972 | Sasso et al. | 210/10 |
| 3,674,428 | 7/1972 | Dean et al. | 210/50 |
| 3,720,609 | 3/1973 | Smith et al. | 210/59 |
| 3,790,370 | 2/1974 | Lalancette | 210/42 |

Primary Examiner—Thomas G. Wyse
Attorney, Agent, or Firm—Burgess, Dinklage & Sprung

[57] ABSTRACT

When a bituminous emulsion is added to a water-containing sludge, the sludge is instantaneously separated into an aqueous layer and a solid layer. But, heavy metals other poisonous pollutants cannot be removed from the separated aqueous layer. In contrast, when a sulfur compound or colloidal sulfur is added to such sludge in combination with a bituminous emulsion, heavy metals and other poisonous pollutants are converted to water-insoluble or hardly soluble sulfur compounds and they are readily removed from the separated water layer. When an inorganic coagulant or organic polymeric coagulant is added in combination, the coagulating and solidifying effects can be further increased. Moreover, the heavy metals and other pollutants fixed in the solid layer are hardly dissolved out and therefore, the separated solid cakes can be used for reclaiming or as water shielding walls.

16 Claims, No Drawings

SLUDGE TREATING PROCESS

This invention relates to a process for treating sludges formed at purification of service water, sewage disposal, treatment of water for industrial use and disposal of industrial waste water and other waste water, deposits accumulated in rivers, lakes, harbors and sea coasts, industrial combustion wastes, sludge-like industrial wastes, soils and sands containing industrial wastes and radioactive wastes. More particularly, the invention relates to a sludge disposal process for rendering nonpoisonous and solidifying these sludges and wastes containing poisonous pollutants such as heavy metals and arsenic by incorporating in these sludges and wastes a sulfur compound or colloidal sulfur and a bituminous emulsion. More specifically, the invention relates to a sludge disposal process for rendering sludges nonpoisonous, which comprises incorporating at least one member selected from compounds containing a group —SH, alkali metal salts thereof and polysulfides (hereinafter referred to as "sulfur compounds") and colloidal sulfur into sludges containing poisonous pollutants such as heavy metals, e.g., mercury, cadmium, chromium, lead and copper, heavy metal comounds, various heavy metal ions, compounds of arsenic and phosphorus, PCB and radioactive substances (which will hereinafter be referred to as "poisonous pollutants" inclusively), to convert these poisonous pollutants to insoluble or hardly soluble, readily-catchable stable forms, and then adding a bituminous emulsion to the sludges to coagulate and solidify the poisonous pollutants together with solids in the sludges by the coagulating action of the asphalt emulsion. Further, the present invention includes a modification of the above sludge disposal process in which an organic coagulant is incorporated together with the sulfur compound or colloidal sulfur in order to accelerate coagulation and solidification of metal ions and fine solids, facilitate the solid-liquid separation and improve the suspended solids (SS) and chemical oxygen demand (COD).

It is a primary object of the present invention to provide a process for rendering nonpoisonous sludges containing poisonous pollutants and to utilize industrially treated sludges.

According to the present invention, poisonous pollutants contained in sludges and causing environmental pollutions, such as heavy metals, are converted to water-insoluble or hardly soluble forms, which will not be dissolved out by contact with rain water, underground water, fresh water and sea water, regardless of whether these pollutants are soluble or hardly soluble, by using a sulfur compound or a colloidal sulfur optionally in combination with a coagulant, and the so converted poisonous pollutants are coagulated and solidified together with solids in the sludges by addition of a bituminous emulsion. Accordingly, all the poisonous pollutants are included in the coagulated and solidified sludges in the insoluble state surrounded by the asphaltic substance having high water resistance, corrosion resistance and adhesiveness. Therefore, the poisonous pollutants are not contained at all in separated water recovered when the process of the present invention is practiced. Further, they are not dissolved out from the coagulated sludges and hence, occurrence of secondary pollution can be completely prevented.

Further, when excessive free water is present in sludges and the process of the present invention is applied to treatment of such sludges, the free water is made transparent and the free water and coagulated and solidified sludges are definitely separated into two layers, namely upper and lower layers. Therefore, industrial separation of the coagulated and solidified sludges from water can be greatly facilitated.

The sludges coagulated and solidified according to the present invention are excellent in water resistance, corrosion resistance, waterproofness and stickiness, and they can be used as binders for aggregates such as gravel, ground stone, ballast, sand, soil and the like, and suitable hardness and mechanical strength can be imparted by adding cement or lime to the coagulated and solidified sludges or their mixtures with aggregates. Accordingly, they can be applied effectively to industrial uses as reclaiming materials, water-shielding walls and the like. In short, sludges containing poisonous pollutants such as mentioned above can be treated and utilized industrially without causing secondary pollutions according to the above-mentioned process of the present invention.

Embodiments of the present invention will now be described in detail.

Sulfur compounds to be used in the present invention are first described. The compound having an —SH group and its alkali metal salt include thiol compounds having a group —SH, dithio-acid compounds having a

group, dithio-carbamic acids having an

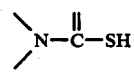

group, and alkali metal salts of these compounds. As specific examples, there can be mentioned dodecyl mercaptan, its sodium salt, imidazoline type mercaptan, mercaptobenzothiazole, sodium diethyl dithiocarbamate, thiol type chelate resins, dithio-acid type chelate resins, dithiocarbamic acid type chelate resins, thiol derivatives of polyvinyl alcohol and thiol type natural polymers (animal hairs). These sulfur compounds are used in the form of a fine powder, a crystalline fine powder or an aqueous solution.

As the polysulfide to be used as the sulfur compound in the present invention, there can be mentioned alkali metal polysulfides, alkaline earth metal polysulfides and ammonium polysulfides. Among these polysulfides, those capable of reacting with water and forming colloidal sulfur of the nascent state, such as calcium polysulfide are especially preferred because they accelerate bonding of sulfur to poisonous pollutants and prevent sulfides from being dissolved in separated water.

By the colloidal sulfur is meant sulfur capable of being readily dispersed in water by itself or with the aid of a small amount of a dispersant or surface active agent to form a colloidal dispersion. For example, precipitated colloidal sulfur can be mentioned.

The bituminous emulsion to be used in the present invention is an emulsion formed by emulsifying a bituminous substance with at least one member selected from cationic, anionic and non-ionic surface active agents. An acid, an alkali, a salt, a protective colloid, bentonite, clay, a solvent or the like may be added to the emulsion to adjust properties thereof. As the bituminous substance to be used for formation of the bituminous substance emulsion, there can be employed at least one member selected from straight asphalt, blown asphalt, semiblown asphalt, natural lake asphalt, coal tar, oil tar, pitch, rubber-incorporated asphalt and resin-incorporated asphalt. Solvents such as kerosene, mineral spirit and naphtha, fuel oil, other mineral oils, fatty acids, naphthenic acid, fat oils and the like may be added to these bituminous substances.

Any of cationic, anionic and non-ionic emulsions may be used as the bituminous emulsion. However, cationic asphalt emulsions are generally excellent in the coagulating and solidifying effects. The bituminous emulsion has generally a bituminous substance content of 50 to 70% by weight.

When a compond having an —SH group or its alkali metal salt is added to sludges, it reacts with heavy metals, heavy metal ions, heavy metal compounds, arsenic ions, arsenic compounds and other poisonous pollutants contained in the sludges to convert them to water-insoluble or hardly soluble chelate compounds and other stable compounds. When a polysulfide or colloidal sulfur is added to sludges, it can convert heavy metals, heavy metal ions, heavy metal compounds, arsenic ions, arsenic and other poisonous pollutants in the sludges to water-insoluble or hardly soluble stable sulfides and other compounds. These insoluble or hardly soluble compounds take, in many cases, a finely divided powdery or particulate form, and in this state, they readily flow away and diffuse by movement of water. However, when a bituminous emulsion such as mentioned above is added, they are readily coagulated and solidified together with soil particles, colloid particles, organic materials and the like in the sludges. In this case, when a cationic bituminous emulsion is employed, bituminous substance particles charged electrically positively in the emulsion are readily connected electrically to soil particles, colloid particles and insolubilized pollutants charged electrically negatively in water, and therefore, coagulation and solidification can be accomplished very easily.

Bituminous emulsions are effective for coagulation of fine particles, which can hardly be coagulated even by organic polymeric coagulants. Bituminous emulsions are especially effective for sludge pollutants stuck to fine soild particles in the sludges. Further, bituminous emulsions have not only an activity of coagulating poisonous pollutants together with solids of the sludges but also an activity of solidifying these coagulated solids. Therefore, solids and poisonous pollutants are effectively prevented from flowing away and diffusion.

In accordance with a preferred embodiment of the present invention, an inorganic coagulant or organic polymeric coagulant may be used in combination with the bituminous emulsion so as to assist the coagulating and solidify-activities of the bituminous emulsion. This preferred embodiment will now be described.

Inorganic coagulants having a pH-adjusting activity, a coagulating activity, a coagulation assisting activity or a similar activity are used. As the inorganic coagulant to be used in the present invention, there can be mentioned, for example, basic aluminum chloride, PAC, sodium aluminate, ferrous sulfate, ferric sulfate, ferric chloride, barium chloride, titanium chloride, unslaked lime, slaked lime, alum, acids, alkalis, bentonite, acidic bentonite, fly ash, acidic fly ash, acid clay and diatomaceous earth.

As the organic polymeric coagulant to be used in the present invention, there can be mentioned, for example, polyacrylamide and polyacrylamide derivatives (inclusive of cationic and anionic derivatives), polyacrylic acid salts, polyacrylic acid-maleic acid copolymer salts, polyethyleneamine-vinylpyridine copolymers, polyvinyl alcohol, polyvinylpyridine salts, polyethyleneamine-vinylpyridine copolymer salts, polyoxyethylene polyvinylbenzyltrimethyl ammonium chloride, polythiourea acetate salts, gelatin, sodium alginate and chitosan.

These inorganic coagulants and organic polymeric coagulants may be used singly, or they may be used in the form of a mixture of two or more of them. Use of the coagulants promotes the coagulating activity of the bituminous emulsion and has an effect of reducing the COD value in the separated liquid. The time of addition of the coagulant is not particularly critical, but it is preferred that the coagulant be added prior to addition of the bituminous emulsion.

In practice the present invention, if the coagulant to be combined with the bituminous emulsion is appropriately chosen and is applied skillfully to the sludge treatment, the effects of the present invention can be highly enhanced. For example, when chromium in sludges is present in the form of so-called hexa-valent chromium such as chromic or dichromic ions, hexa-valent chromium ions can be caught as precipitates of barium chromate or chromium hydroxide and hexa-valent chromium ions can be rendered nonpoisonous, by (1) a process comprising adjusting the pH of the sludges to neutral or substantially neutral pH, adding to the sludges barium chloride (a kind of the inorganic coagulant) in a suitable amount, namely in an amount necessary for precipitating hexavalent chromium ions present in the sludges, to convert hexavalent chromium ions to insoluble barium chromate, and adding to the sludges a sulfur compound or colloidal sulfur and a bituminous emulsion, or (2) a process comprising adding to the sludges containing hexa-valent chromium ions, sulfuric acid (a kind of the inorganic coagulant) and ferric sulfate in an amount necessary for reducing hexa-valent chromium ions present in the sludges to tri-valent chromium ions, adding to the sludges slaked lime (a kind of the inorganic coagulant) in an amount necessary for neutralizing excessive sulfuric acid to effect neutralization, and adding to the sludges a sulfur compound or colloidal sulfur and a bituminous emulsion.

When penta-valent arsenic ions are present in sludges, they can be easily caught and treated by adding to the sludges an acid such as sulfuric acid or hydrochloric acid (a kind of the inorganic coagulant) to render the sludges acidic (reduce the pH below 6) or adding to the sludges ferrous sulfate or the like to reduce penta-valent arsenic ions to tri-valent arsenic ions, and then adding to the sludges a sulfur compound or colloidal sulfur and a bituminous emulsion to perform the coagulating and solidifying treatment.

In practicing the process of the present invention, the compound having an —SH group or its alkali metal salt should be added to sludges in an amount of at least 2 molecules per atom of heavy metals, arsenic and the like contained in the sludges. The amount of the above sulfur compound or its alkali metal salt may be changed appropriately depending on the form and amount of poisonous pollutants such as heavy metals and arsenic.

The polysulfide or colloidal sulfur is added in an amount larger than the amount necessary for heavy metals and arsenic in the sludges to form their sulfides. In the case of ordinary sludges containing about 100 ppm of poisonous pollutants such as heavy metals and arsenic, the compound having an —SH group or its alkali metal, the polysulfide or colloidal sulfur is generally added in an amount of 0.01 to 5 parts by weight per 100 parts by weight of the sludges. The bituminous emulsion is generally added in an amount of 10 to 400 parts by weight, preferably 20 to 250 parts by weight (as calculated as the emulsion of a non-volatile content of 50% by weight), per 100 parts by weight of the solids in the sludges. Of course, the amount of the bituminous emulsion may be changed appropriately depending on the properties of the sludges and the forms and amounts of poisonous pollutants such as heavy metals and arsenic. Especially good results are obtained when the weight ratio of the non-volatile components in the bituminous emulsion to the solids in the sludges is within a range of from 0.5:1 to 2:1. In this case, coagulation and solidification can be accomplished very promptly even without using the coagulant. Of course, also in this case, the coagulant may be added so as to further accelerate coagulation and solidification, remove suspended solids in the separated liquid and reduce the COD value. When an inorganic coagulant is employed, it is preferred that the coagulant be added in an amount of 0.05 to 30 parts by weight per 100 parts by weight of the solids of the sludges, and when an organic polymeric coagulant is used, it is preferred that the coagulant be added in an amount of 1 to 1000 ppm based on the weight of the solids of the sludges.

In practicing the process of the present invention, the temperature is not critical. The process may be conducted even at room temperature, but good results are obtained when the treatment is carried out under heating up to 80° C, usually up to 50°–60° C. The pH of water in the sludges is not particularly critical, but it is preferred that water be kept slightly acidic, neutral or slightly alkaline.

No particular apparatus or equipment is necessary for practicing the process of the present invention, and commercially available mixing machines are chosen appropriately depending on the water content of sludges to be treated. For example, intended mixing can be accomplished by such conventional mixing machines as a mortar mixer, a paddle mixer, a bag mill, a ribbon mixer, a kneader, a screw type mixer and an Eirich mixer. Further, an apparatus for imparting slow agitation, such as a sedimentation tank for treatment of service water or sewage, can also be used in the present invention.

According to the present invention, the coagulated solids and free water are separated very definitely into two layers, and hence, both the layers can be efficiently separated according to a customary method without using a particular filter.

This invention will now be described in detail by reference to the following Examples that by no means limit the scope of the invention. In these examples, all of "parts" and "%" are by weight unless otherwise indicated.

EXAMPLE 1

1 Part of dodecyl mercaptan was added to 100 parts of a mercury-contaminated sludge formed by adding mercuric bichloride to a silt type sludge (having a water content of 80%) so that the mercury concentration was 100 ppm. Then, 35 parts of a cationic asphalt emulsion (having a non-volatile content of 60%) were added to the sludge and they were mixed. Instantaneously, the mixture was separated into a clear transparent water layer (upper layer) and an asphalt-sludge solid layer (a mixture of the asphalt in the emulsion and the poisonous pollutant-containing solid in the sludge, which contained a small amount of water). The water layer was separated from the solid layer of decantation, and the separated liquid was analyzed. It was found that no mercury was contained. The asphalt-sludge solid was subjected to the dissolution test according to the test method for determining poisonous pollutants contained in industrial wastes, specified in Notification No. 13 of the Environmental Agency. It was found that no mercury was dissolved out.

For comparison, 35 parts of a cationic asphalt emulsion were added to 100 parts of the same mercury-contaminated sludge as prepared above. Instantaneously, the mixture was separated into an upper aqueous layer and a lower solid layer (asphalt-sludge solid). When the separated liquid (upper layer) was analyzed, it was found that the total mercury content was 15 ppm.

EXAMPLE 2

1 Part of Soxinol M (mercaptobenzothiazole manufactured and sold by Mitsui Kagaku) was added to 100 parts of a mercury- and cadmium-contaminated sludge formed by adding to a silt type sludge (having a water content of 80%), mercuric bichloride and cadmium acetate so that the mercury and cadmium concentrations were 100 ppm and 5 ppm, respectively. Then, 50 parts of a cationic asphalt emulsion (having a non-volatile content of 50%) were added to the contaminated sludge and mixed therewith. Instantaneously, the mixture was separated into a transparent water layer (upper layer) and an asphalt-sludge solid layer (lower layer). When the separated liquid (water layer) was analyzed, neither mercury nor cadmium was detected (the detection limit being 0.005 ppm) and the COD value was 70 ppm. When the solid layer was subjected to the dissolution test according to the method described in Example 1, neither mercury nor cadmium was detected.

EXAMPLE 3

1 Part of Soxinol was added to 100 parts of the same mercury- and cadmium-contaminated sludge as prepared in Example 2, followed by addition of 1 part of slaked lime. Then, 50 parts of a cationic asphalt emulsion (same as used in Example 2) were added to the sludge and mixed therewith. Instantaneously, coagulation took place in the solids and the mixture was separated into an upper transparent water layer and a lower solid layer. When the separated liquid (water layer) was analyzed, neither mercury nor cadmium was detected and the COD value was 30 ppm.

EXAMPLE 4

1 Part of dodecyl mercaptan and 5 parts of slaked lime were added to a sludge (having a water content of 70%) containing 300 ppm of total mercury, 15 ppm of cadmium, 150 ppm of lead and 130 ppm of arsenic, and then, 40 parts of a cationic asphalt emulsion (having a non-volatile content of 60%) were added to the sludge and mixed therewith. Instantaneously, the mixture was separated into a transparent water layer and an asphalt-sludge solid layer. When the separated liquid (water layer) was analyzed, neither mercury, nor cadmium nor lead was detected, and the arsenic content was 0.188 ppm and the COD value was 40 ppm. When the asphalt-sludge solid layer was subjected to the dissolution test, none of the mercury, cadmium and lead were detected, and the dissolved-out arsenic was 0.028 ppm and the COD value was 8 ppm.

For comparison, 5 parts of slaked lime was added to 100 parts of the same sludge as mentioned above, and 40 parts of the same cationic asphalt emulsion as mentioned above was added to the sludge and mixed therewith. The mixture was separated into a transparent water layer and an asphalt-sludge solid layer. When the separated liquid (water layer) was analyzed, the total mercury content was 0.006 ppm, cadmium was not detected, the lead content was 0.01 ppm, the arsenic content was 0.244 ppm and the COD value was 43 ppm. When the asphalt-sludge solid was subjected to the dissolution test, mercury was not detected, but the dissolved-out cadmium, lead and arsenic were 0.005 ppm, 0.01 ppm and 0.058 ppm, respectively.

EXAMPLE 5

2 Parts of calcium polysulfide was added to 100 parts of a contaminated sludge formed by adding mercuric bichloride to a silt type sludge (having a water content of 75%) so that the mercury concentration in the sludge was 100 ppm. Then, 50 parts of a cationic asphalt emulsion (having a non-volatile content of 60%) were added to the sludge and mixed therewith. Instantaneously, the mixture was separated into an upper transparent water layer and a lower asphalt-sludge solid layer. When the separated water layer was analyzed, no mercury was detected. Further, when the asphalt-sludge solid layer was subjected to the dissolution test, no mercury was detected.

EXAMPLE 6

2 Parts of calcium polysulfide was added to 100 parts of a contaminated sludge formed by adding cadmium chloride to a sewage sludge (having a water content of 70%) so that the cadmium concentration in the sludge was 5 ppm. Then, 40 parts of an anionic asphalt emulsion (having a non-volatile content of 60%) and 5 parts of slaked lime were added to the sludge and mixed therewith. The mixture was separated into a free water layer and an asphalt-sludge solid layer. When the separated water layer was analyzed, no cadmium was detected and the COD value was 54 ppm. When the asphalt-sludge solid layer was subjected to the dissolution test, no cadmium was detected.

EXAMPLE 7

3 Parts of colloidal sulfur were added to 100 parts of a mercury-contaminated sludge formed by adding mercuric bichloride to a service water sludge (having a water content of 75%) so that the mercury concentration in the sludge was 100 ppm. Then, 50 parts of a cationic asphalt emulsion (having a non-volatile content of 60%) were added to the sludge and mixed therewith. The mixture was separated into a free water layer and an asphalt-sludge solid layer. When the separated water layer was analyzed, no mercury was detected and the COD value was 65 ppm. When the asphalt-sludge solid layer was subjected to the dissolution test, no mercury was detected.

EXAMPLE 8

3 Parts of colloidal sulfur were added to 100 parts of the same mercury-contaminated sludge as prepared in Example 7, and 30 ppm (based on the sludge) of polyacrylamide were, added to the sludge and mixed therewith. Then, 50 parts of the same cationic asphalt emulsion as used in Example 7 was added to the above mixture and mixed therewith to separate the mixture into a free water layer and an asphalt-sludge solid layer. When the separated water layer was analyzed, no mercury was detected and the COD value was 30 ppm. When the asphalt-sludge solid layer was subjected to the dissolution test, no mercury was detected.

EXAMPLE 9

A cement mortar mixer was charged with 1000 parts of sandy slag (having a hexa-valent chromium content of 5000 ppm), and 1000 parts of water was added thereto and the mixture was sufficiently kneaded. Then, 100 parts of a 22.5% aqueous solution of barium chloride were added and the mixture was kneaded sufficiently. Further, 1 part of colloidal sulfur and 100 parts of a cationic asphalt emulsion (having a non-volatile content of 60%) were added and the mixture was kneaded to coagulate and solidify the sandy slag, insolubilized chromium compounds and the like by the asphalt. Separated water was colorless and transparent, and the total chromium content in the separated water was 1.5 ppm. Thus, it was found that the intended object of the present invention was attained sufficiently.

EXAMPLE 10

A cement mortar mixer was charged with 1000 parts of sandy slag (having a hexa-valent chromium content of 5000 ppm), and 80 parts of a 1% aqueous solution of sulfuric acid were added thereto and the mixture was sufficiently kneaded. Then, 50 parts of powdery ferrous sulfate was added and the mixture was sufficiently kneaded. Further, 20 parts of slaked lime powder were added and the mixture was sufficiently kneaded. Then, 5 parts of calcium polysulfide and 100 parts of a cationic asphalt emulsion (having a non-volatile content of 60%) were added and the mixture was kneaded to coagulate and solidify the sandy slag, chromium compounds and the like by the asphalt. Separated water was colorless and transparent, and the total chromium content in the separated water was 2.2 ppm. Thus, it was found that the object of the present invention was attained sufficiently.

As is apparent from the foregoing, when sludges containing poisonous pollutants are treated according to the present invention, heavy metals in the sludges such as mercury and cadmium and poisonous pollutants in the sludges are converted to water-insoluble or hardly soluble forms by a coagulant such as a sulfur compound or colloidal sulfur regardless of whether these pollutants are water soluble or hardly soluble in water, and these pollutants are coagulated and solidified together with solids of the sludges by a bituminous emulsion, whereby they are readily separated from water. Further, these poisonous pollutants are not substantially detected in separated water, and even at the dissolution test of the coagulated and solidified asphalt-sludge solids, dissolving-out of the pollutants is not substantially detected, and it is seen that the pollutants in the sludges are completely blocked and sealed in the solid layer. Moreover, the resulting asphalt-sludge solid layer is tightly bonded and caked and it is so stable that it is not disentangled in water at all. Accordingly, it can be used effectively for reclaiming as it is or it can be used for construction of water-shielding walls by utilizing its high waterproofness. From the results shown in the foregoing examples, it will also be understood that use of a coagulant not only promotes blocking and sealing of pollutants but also reduces the COD value in separated water. This fact means that separated water can be discharged directly as it is without a fear of causing secondary pollutions.

In addition, it is noted that when cement is further added, the present process is carried out with more advantage in view of the fact that dehydration of the sludge can be effectively attained.

What is claimed is:

1. A process for treating sludges containing mercury, cadmium, lead or arsenic as poisonous pollutants, which comprises adding to the sludges a bituminous emulsion and dodecyl mercaptan, thereby to coagulate and solidify the sludges.

2. A sludge treating process according to claim 1 wherein the bituminous emulsion is a cationic, anionic or non-ionic bituminous emulsion.

3. A sludge treating process according to claim 1 wherein the bituminous emulsion has a non-volatile content of 50 to 70% by weight.

4. A sludge treating process according to claim 1 wherein the bituminous component in the bituminous emulsion is at least one member selected from the group consisting of straight asphalt, brown asphalt, semiblown asphalt, natural lake asphalt, coal tar, oil tar, pitch, rubber-incorporated asphalt and resin-incorporated asphalt.

5. A sludge treating process according to claim 1 wherein the bituminous emulsion is a cationic bituminous emulsion.

6. A sludge treating process according to claim 1 wherein the dodecyl mercaptan is added in an amount of 0.01 to 5 parts by weight per 100 parts by weight of the sludges.

7. A sludge treating process according to claim 1 wherein the bituminous emulsion is added in an amount of 10 to 400 parts by weight, as calculated as the emulsion having a non-volatile content of 50% by weight, per 100 parts by weight of solids in the sludges.

8. A sludge treating process according to claim 1 wherein the bituminous emulsion is added in such an amount that the weight ratio of non-volatile components in the emulsion to solids in the sludges is within a range of from 0.5:1 to 2:1.

9. A sludge treating process according to claim 1 wherein an inorganic coagulant or organic polymeric coagulant is added to the sludges.

10. A sludge treating process according to claim 9 wherein the inorganic coagulant is at least one member selected from the group consisting of aluminum sulfate, basic aluminum chloride, PAC, sodium aluminate, ferrous sulfate, ferric sulfate, ferric chloride, barium chloride, titanium chloride, unslaked lime, slaked lime, alum, acids, alkalis, bentonite, acidic bentonite, fly ash, acidic fly ash, acid clay and diatomaceous earth.

11. A sludge treating process according to claim 10 wherein the inorganic coagulant is added in an amount of 0.05 to 30 parts by weight per 100 parts by weight of solids in the sludges.

12. A sludge treating process according to claim 9 wherein the organic polymeric coagulant is at least one member selected from the group consisting of polyacrylamide, polyacrylamide derivatives, polyacrylic acid esters, polyacrylic acid-maleic acid copolymer salts, polyethyleneamine-vinylpyridine copolymers, polyvinyl alcohol, polyvinylpyridine salts, polyethyleneamine-vinylpyridine copolymer salts, polyoxyethylene polyvinylbenzyltrimethyl ammonium chloride, polythiourea acetate salts, gelatin, sodium alginate and chitosan.

13. A sludge treating process according to claim 12 wherein the organic polymeric coagulant is added in an amount of 1 to 1000 ppm based on the weight of solids in the sludges.

14. A sludge treating process according to claim 9 wherein the inorganic or organic polymeric coagulant is added prior to addition of the bituminous emulsion.

15. A process for treating sludges containing mercury as a poisonous pollutant, which comprises adding to the sludges a bituminous emulsion and colloidal sulfur, thereby to coagulate and solidify the sludges.

16. A process for treating sludges containing mercury and cadmium as poisonous pollutants, which comprises adding to the sludges a bituminous emulsion and mercaptobenzothiazole, thereby to coagulate and soldify the sludges.

* * * * *